Figure 1:
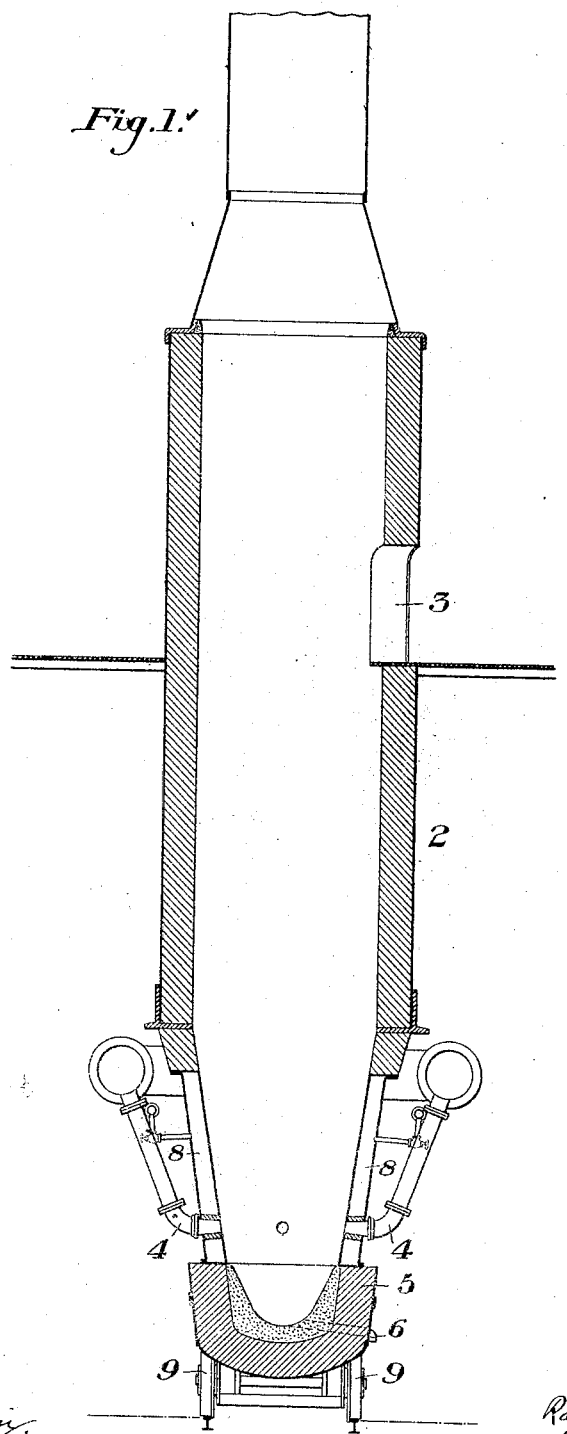

No. 832,948. PATENTED OCT. 9, 1906.
R. BAGGALEY.
METHOD OF RECOVERING IRON AND STEEL FROM SLAGS.
APPLICATION FILED FEB. 8, 1906.

2 SHEETS—SHEET 1.

WITNESSES
R. A. Balderson
Warren W. Swartz

INVENTOR
Ralph Baggaley
by Bakewell Byrnes
his attys

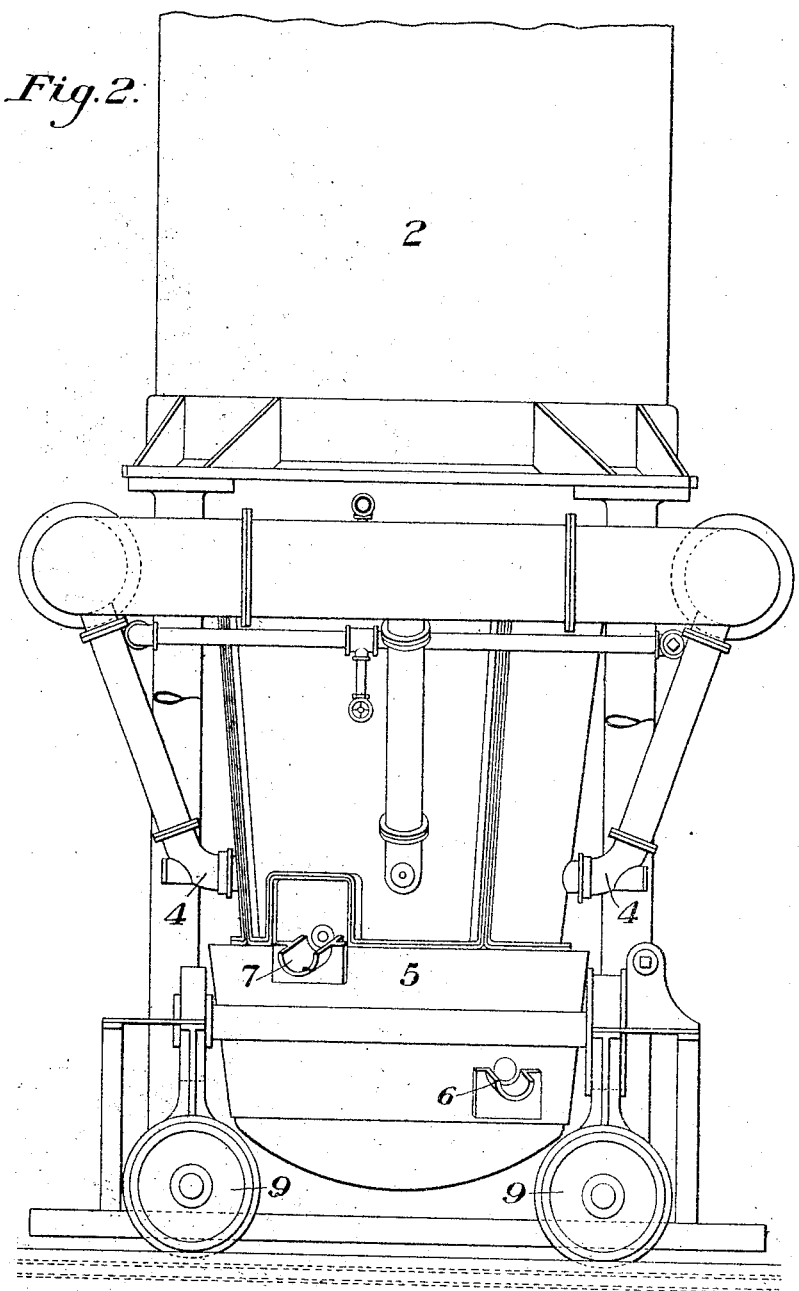

UNITED STATES PATENT OFFICE.

RALPH BAGGALEY, OF PITTSBURG, PENNSYLVANIA.

METHOD OF RECOVERING IRON AND STEEL FROM SLAGS.

No. 832,948. Specification of Letters Patent. Patented Oct. 9, 1906.

Application filed February 8, 1906. Serial No. 300,073.

*To all whom it may concern:*

Be it known that I, RALPH BAGGALEY, of Pittsburg, Allegheny county, Pennsylvania, have invented a new and useful Method of Recovering Iron and Steel from Ferruginous Slags, of which the following is a full, clear, and exact description, reference being had to the accompanying drawings, in which—

Figure 1 is a vertical central section through a furnace suitable for the practice of my invention; and Fig. 2 is an elevation, on a larger scale, of the lower part of the furnace.

My present invention employs, in lieu of carefully-selected oxidized-iron ores as a source of iron, ferruginous slags that result from the separation of copper, gold, and silver from their ores, and which ores notoriously contain large proportions of impurities of the most objectionable kind. This material is being produced in vast quantities, amounting to thousands of tons daily, wherever copper ores are under treatment and wherever copper is produced. There is not, however, to my knowledge any instance where this material is now used or where it ever has been used as a source from which to produce iron or steel, as contemplated by this invention. It is universally regarded simply as a waste by-product and an extremely expensive one to dispose of at all copper-producing plants. The difficulties of recovering the iron by reason of its association with its many objectionable impurities are very great, and thus far they have baffled the most expert metallurgists. Yet the fact remains that pig-iron and steel are invariably expensive and scarce wherever copper-smelters are operated. Hence the recovery of such iron from such waste material for use in the arts is important. It will be apparent that in using this waste by-product as the source of an iron-supply I may be able to do things and to sacrifice proportions of such iron in my various treatment processes necessary in expelling the objectionable impurities that would not be commercially possible where high-priced oxidized and selected ores are depended upon as the original source of the iron-supply.

I am aware that the cinder resulting from the subliming of non-cupriferous ores used by the manufacturers of sulfur and sulfurous, sulfuric, and anhydrous acids has been, or at all events is, capable of being used in the manufacture of cast-iron and Bessemer steel; but the ability to use this cinder for the purpose stated, in so far as Bessemer steel is concerned, is due solely to two facts: first, because copper is not present or is present in minute proportions; second, because of the fact that such ores by some strange freak of nature are always devoid of phosphorus. Sulfur and sulfurous, sulfuric, and anhydrous acids may also be produced from ores that contain copper, and in this case the resultant cinders are often subsequently treated for the recovery of the copper; but, so far as I know, they have not been made to yield up their contained iron in such form as to make it valuable for use in the arts.

The object of my invention is to save the iron contained in the ferruginous slag of copper-smelting furnaces, that has heretofore been wasted, by utilizing such slag as a substitute for iron ores; and to that end my invention consists in first smelting such ferruginous slags in combination with carbonaceous fuel in a suitable furnace, employing for the purpose of separating the contained iron such fluxing agent, preferably limestone, as may be essential.

I use such intense heats as may be necessary to accomplish the separation of the silica, and thereby I am enabled to replace the silica with the silicate of lime, which thereafter readily separates from the iron. The heat which is employed in the furnace is much higher than that which is employed in the ordinary blast-furnaces for smelting iron ores, since I have discovered that in order successfully to obtain the iron from copper-smelter slags and to separate it from the impurities therein I must employ not only a large percentag of fluxing material, but a much higher heat than must be employed in the smelting of iron ores. I believe that in this way I am the first to provide for the successful and economical smelting of a hitherto waste product. The furnace which I employ is adapted to withstand such high heat, and for that purpose its lower portion is either formed of water-cooled sections or of other material which can withstand the high temperature employed.

A very suitable furnace for practicing this invention is that fully illustrated and described in the United States patent granted to me on December 8, 1903, and numbered 746,238, because in it I preferably use a magnesite lining, which is protected with water-jackets in which the flow of the cooling agent is regulated at will, and I also have available an auxiliary heat capable of any desired intensity and capable of instant regulation. I can also aid the process by means of the converting-blast, though other smelting or melting furnaces may be employed.

The ferruginous slag discharged from copper-smelting furnaces is composed of silica combined with iron and other bases, which fact will demand the use of fluxing agents. The silica can be separated from the contained iron by means of limestone as a fluxing agent. It will be apparent to those skilled in the art that the lime of the limestone and the silica will combine as a slag, and thereafter in the operation of bessemerizing the various impurities are eliminated in succession in the order of their oxidation. The last vestiges of the sulfur in their elimination will demand the sacrifice of a considerable percentage of the iron, which in this process is permissible, while in ordinary iron and steel making it is not permissible, for commercial reasons. In some cases also it will demand the almost total elimination of the carbon, and in such cases the carbon must be restored to the bath by means of the addition of suitable percentages of spiegeleisen or ferromanganese as carbon-bearing agents. The product of this smelting operation is cast-iron combined with various impurities, according to the analysis of the ores used, and to convert it into steel I bessermeize it, either by tapping it from the smelting-furnace and transferring it to a converter or by providing the smelting-furnace with a bessemerizing-chamber having twyers through which air can be blown into the molten iron. The decarburized iron thus produced is recarburized with spiegeleisen or other suitable additions and may then be cast into ingots, if forgings are desired, or into other desired forms, if castings are wanted.

I am enabled by my invention to obtain a useful product, either pig-iron or steel, from the ferruginous slag, which hitherto has been treated as a waste material, and in this way I effect a large economy.

In the drawings, 2 represents a smelting-furnace suitable for the practice of my invention, having a charge-opening 3, twyers 4 4, a hearth 5, a metal tap-hole 6, a slag-tap 7, and water-jacket 8. The hearth 5 is preferably movable, being mounted upon wheels 9, so that it can be removed and relined when necessary.

I claim—

1. The method herein described of obtaining iron from the ferruginous slag of a copper-furnace, which consists in smelting such slag with carbonaceous fuel and flux and subjecting it to a temperature higher than that ordinarily employed in an iron blast-furnace; substantially as described.

2. The method herein described of obtaining iron from the ferruginous slag of a copper-furnace, which consists in smelting such slag with carbonaceous fuel and flux, subjecting it to a temperature higher than that ordinarily employed in an iron blast-furnace, and bessemerizing the iron which is produced; substantially as described.

In testimony whereof I have hereunto set my hand.

RALPH BAGGALEY.

Witnesses:
WILLIAM M. KIRKPATRICK,
FRANK L. RILEY.